(12) United States Patent
Altmann et al.

(10) Patent No.: US 6,429,938 B1
(45) Date of Patent: Aug. 6, 2002

(54) MOAT FEATURE FOR A LASER GYROSCOPE BLOCK

(75) Inventors: Gerald R. Altmann, Roberts, WI (US); Rodney H. Thorland, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/584,209

(22) Filed: May 31, 2000

(51) Int. Cl.[7] .............................................. G01C 19/66
(52) U.S. Cl. ........................................ 356/459; 372/94
(58) Field of Search ................................ 356/459, 469; 372/94

(56) References Cited

U.S. PATENT DOCUMENTS

| | | | | |
|---|---|---|---|---|
| 4,691,323 A | * | 9/1987 | Ljung et al. | 356/469 |
| 5,098,189 A | * | 3/1992 | vonBieren | 356/459 |
| 5,181,306 A | * | 1/1993 | Guttner et al. | 29/413 |
| 5,960,025 A | | 9/1999 | Thorland et al. | |

* cited by examiner

Primary Examiner—Samuel A. Turner
(74) Attorney, Agent, or Firm—Dennis C. Bremer

(57) ABSTRACT

A centered annular ring, or moat, is disposed on each of the six planar sides of a RLG block. The surface of each moat is slightly below the surrounding surface of each side of the block. Because each moat is recessed relative to the respective side surface, the moat surface is less likely to become scratched, and therefore allows for a better seal between the block and the components attached thereto.

20 Claims, 3 Drawing Sheets

MOAT FEATURE FOR A LASER GYROSCOPE BLOCK

CROSS-REFERENCE TO RELATED APPLICATION(S)

None.

BACKGROUND OF THE INVENTION

The present invention is a moat feature for achieving high-integrity, airtight seals between an optical apparatus block and the components attached to the block.

One embodiment of this invention is applied to a ring laser gyroscope (RLG). A RLG is commonly used to measure the angular rotation of a vehicle, such as an aircraft. Such a gyroscope has two counter-rotating laser light beams which move within a closed loop path or "ring" with the aid of successive reflections from multiple mirrors. The closed path is defined by an optical cavity which is interior to a structural gyroscope frame or "block". In one type of RLG, the block includes planar top and bottom surfaces that are bordered by six planar sides that form a hexagon-shaped perimeter. Surfaces on each of the sides define mounting areas for components such as mirrors and electrodes. For example, three planar non-adjacent sides of the block form the mirror mounting surfaces for three mirrors at the corners of the optical path, which is triangular in shape.

Operationally, upon rotation of the RLG about its input axis (which is perpendicular to and at the center of the planar top and bottom surfaces of the block), the effective path length of each counter-rotating laser light beam changes, and a frequency differential is produced between the beams that is nominally proportional to angular rate. This differential is then measured by signal processing electronics to determine the angular rotation of the vehicle.

Typically in a RLG block having a triangular shaped optical path incorporating three mirrors, one of the mirrors has a concave reflective surface while the other two mirrors have planar reflective surfaces. The curved mirror serves two main purposes. First, the curvature of the reflective surface controls the diameter and the primary mode of the counter-rotating laser light beams. Second, the curvature of the reflective surface is used to align the counter-rotating laser light beams within the optical cavity so that the light beams are at substantially maximum intensity to minimize RLG bias errors. In particular, this latter purpose is accomplished due to the inherent attributes of the concave reflective surface. Additionally, a typical RLG block has three electrodes, which are disposed one on each of the three planar side surfaces not occupied by mirrors.

It is important that the mirrors and electrodes are securely attached to their respective surfaces, and that the seal between the block and those components is airtight so that a vacuum inside the block is preserved. Typically, the components are soldered onto their respective planar surfaces. However, these surfaces often contain scratches, chips, and fractures, formed during manufacture or handling, which prevent the formation of an airtight seal. There is a need for an improved device and method for achieving a high integrity seal between a RLG block and the components attached thereto.

BRIEF SUMMARY OF THE INVENTION

The present invention is a device and method for achieving an airtight seal between a RLG block and the components attached thereto. The invention comprises disposing a centered annular ring, or moat, on each of the six planar sides of a RLG block. The surface of each moat is slightly below the surrounding surface of each side of the block. Because each moat is depressed relative to the respective side surface, the moat surface is less likely to become scratched, and therefore allows for a better seal between the block and the mirror or electrode attached thereto.

DETAILED DESCRIPTION

Figure 1:
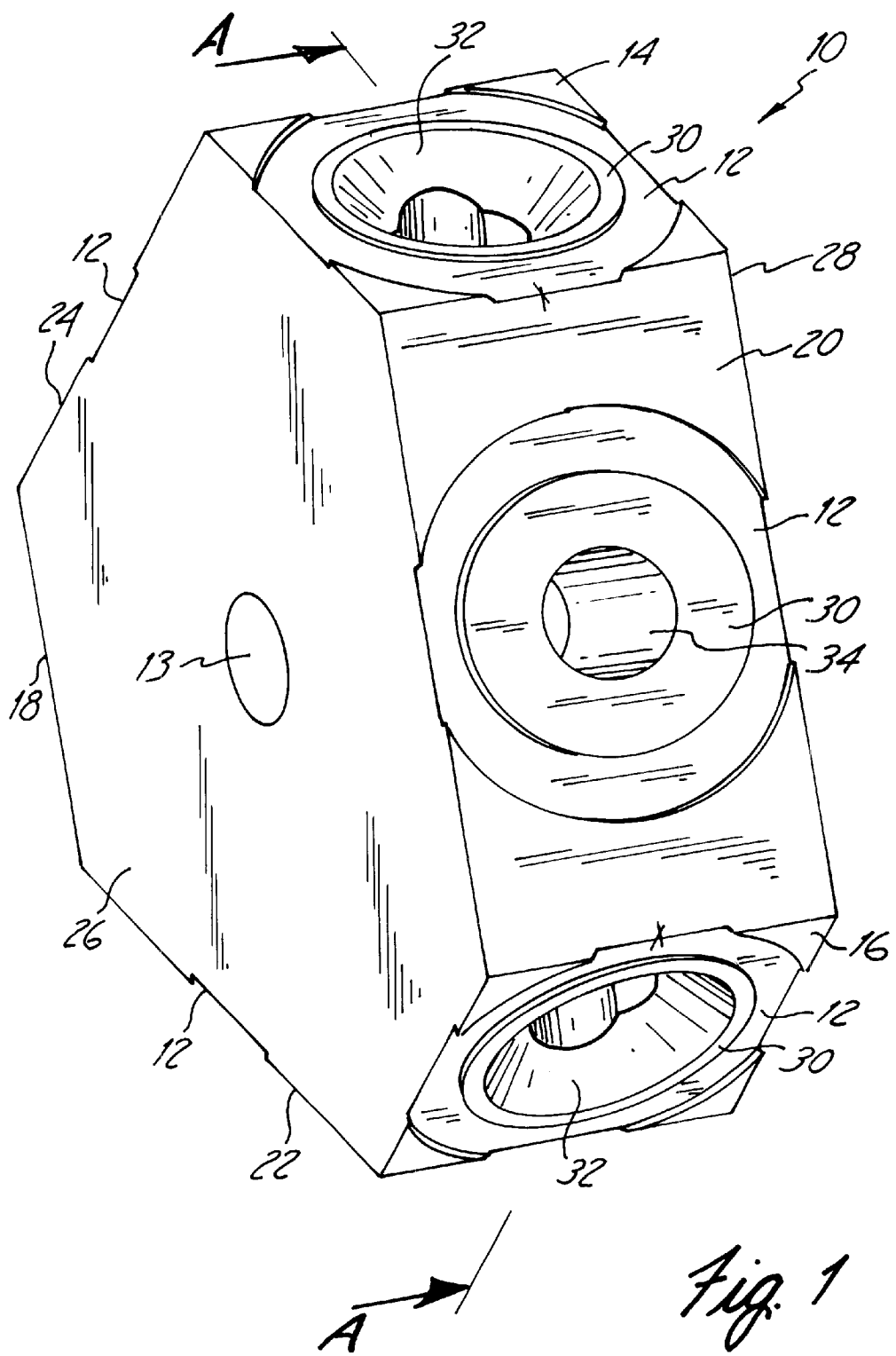
FIG. 1 is a perspective view of a RLG block incorporating the moats of the present invention.

FIG. 1 shows a ring laser gyroscope (RLG) block 10 with moats 12 in accordance with the present invention. Block 10 is preferably formed of a glass, glass ceramic, or like material on turning center 13. Suitable block materials include a glass ceramic material marketed under the trademarks "Cervit" and "Zerodur". An example of a suitable glass material is a borosilicate glass marketed under the trademark "BK-7".

Block 10 is generally triangular shaped with a hexagonal outer periphery. The hexagonal outer periphery includes three planar non-adjacent sides that form first, second and third mirror mounting surfaces 14, 16 and 18, respectively, and three further planar non-adjacent sides 20, 22 and 24, respectively. The mounting surfaces 14, 16, and 18 and sides 20, 22, and 24 form a border for planar top and bottom surfaces 26 and 28, respectively, of block 10.

Recessed moats 12 may be of various shapes and configurations, but in a preferred embodiment, circular moats 12 are machined into block 10 about wells 32 and 34 so that rings 30 are formed substantially concentric to moats 12. The interior edge of each ring 30 is defined by a well 32 or 34 into the interior of block 10. The exterior edge of each ring 30 is defined by the interior edge of corresponding moat 12. The face surfaces of rings 30 are co-planar with the surfaces of planar sides 14, 16, 18, 20, 22, and 24. In comparison, the surfaces of moats 12 are below the surfaces of rings 30 and sides 14, 16, 18, 20, 22, and 24. Preferably, moats 12 may all be the same depth for ease of manufacture.

Figure 3:
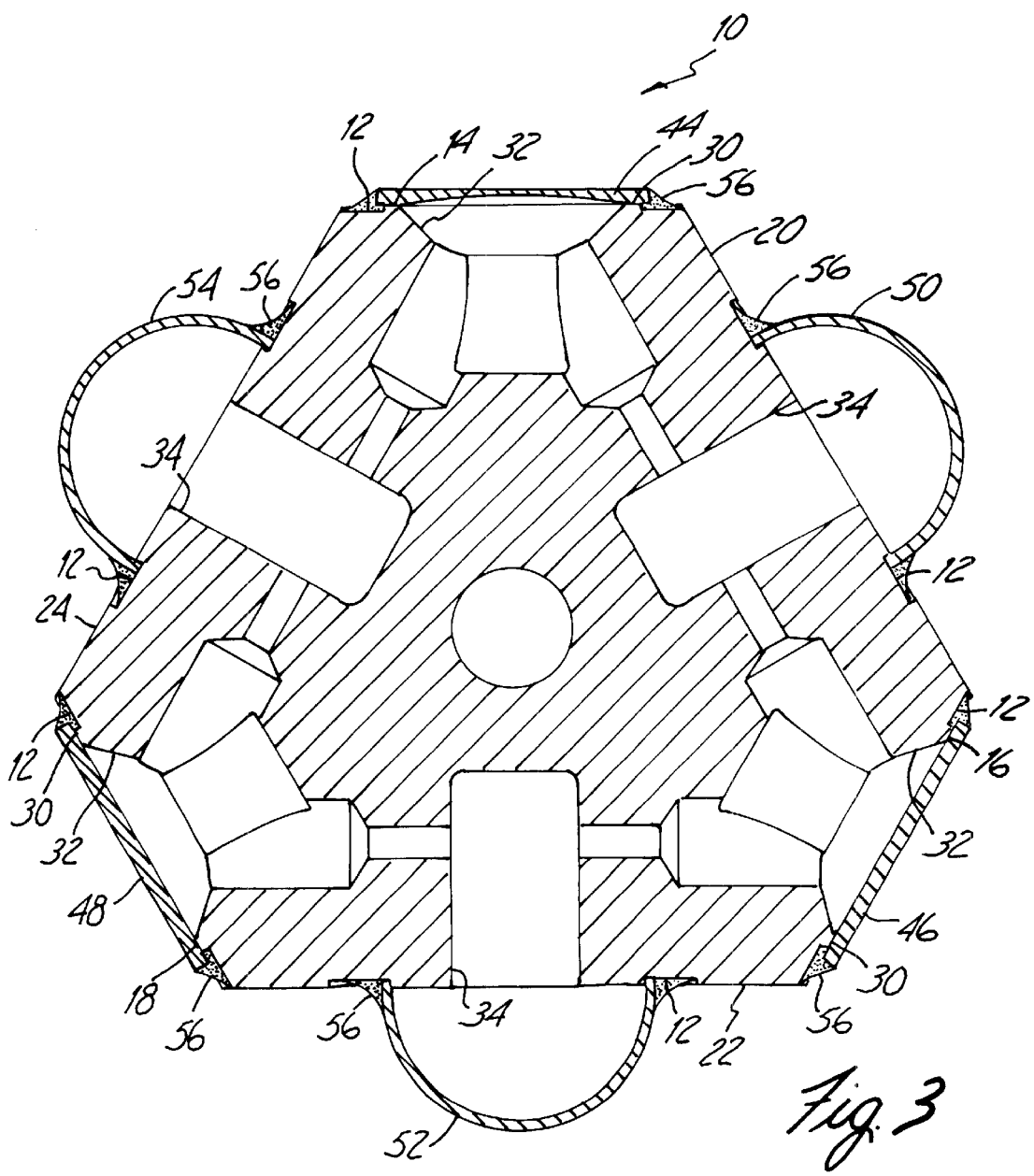
FIG. 3 is a plan section view of a RLG block incorporating the moats of the present invent with attached mirror and electrode components.

As will be shown in FIG. 3, on sides 14, 16, and 18, mirrors rest on the top surface of each of the rings 30. On sides 20, 22, and 24, electrodes rest on the lower surface of each of the moats 12, and so rings 30 are not necessary on those sides. However, the raised surface of rings 30 relative to the recessed surface of moats 12 help to protect the surface of moats 12 from scratches and other damage. Additionally, the combination of rings 30 and moats 12 offers an assembler a "bulls-eye" target for the centering of each component directly above its respective well.

Figure 2:
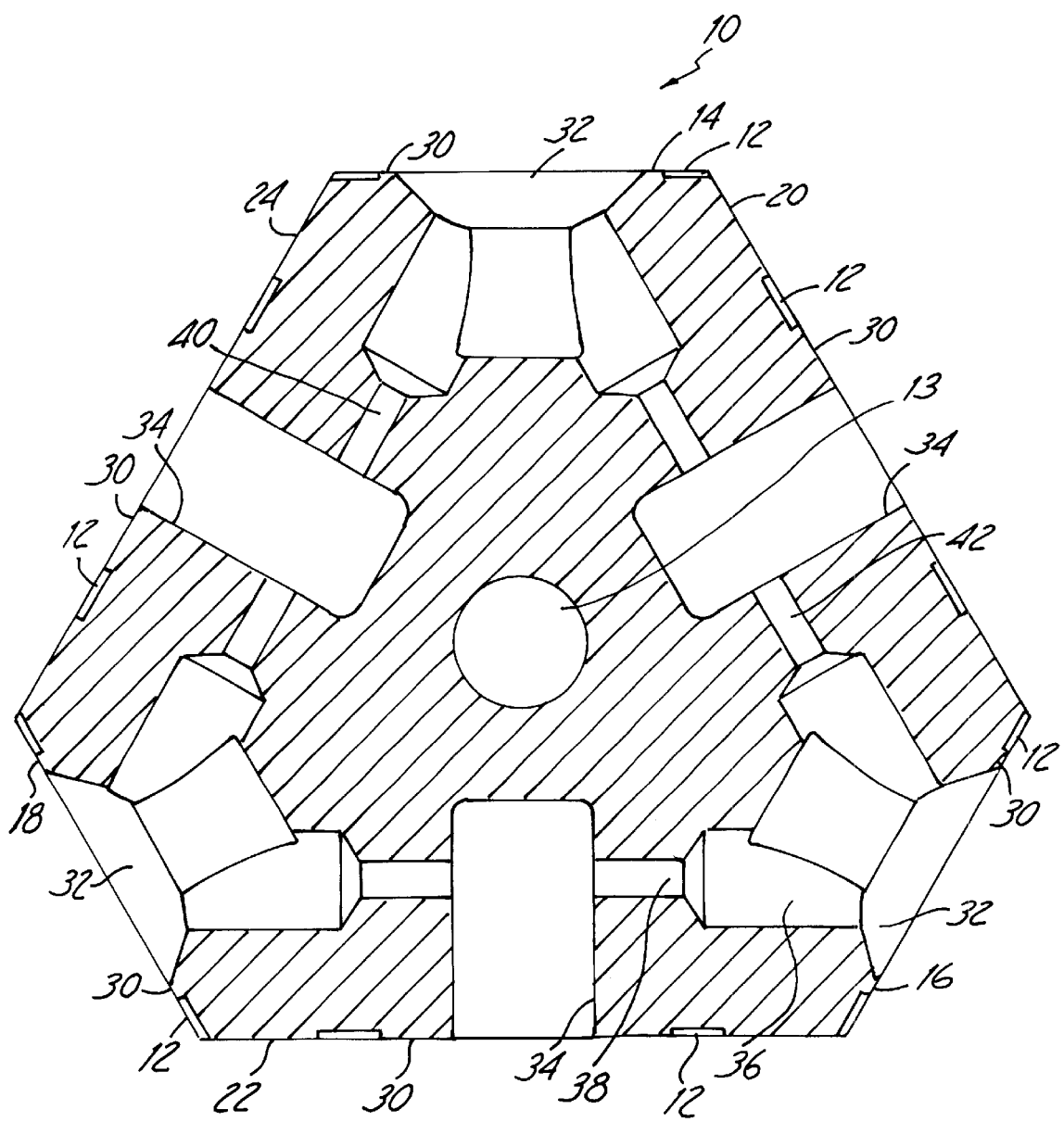
FIG. 2 is plan sectional view of a RLG block incorporating the moats of the present invention, taken along line A–A of FIG. 1.

FIG. 2 is a plan sectional view of a RLG block incorporating moats 12 of the present invention, taken along line A—A of FIG. 1. Parts in FIG. 2 are numbered the same as the corresponding parts in FIG. 1. As shown best in FIG. 2, in a first preferred embodiment, wells 32 on mounting surfaces 14, 16, and 18 are generally partially conical, while wells 34 on sides 20, 22, and 24 are generally cylindrical. In alternative embodiments, wells 32 and 34 may have a variety of shapes, so long as they do not interfere with the path of the light beam.

Moats 12 may be formed by any means known in the art. Preferably, they are machined into block 10 by the same machine that drills the internal structures of block 10. In a preferred embodiment, a CNC (Computer Numerical Control) machine is used.

In a preferred embodiment, an internal optical cavity 36 of the block 10 comprises three substantially straight laser bores 38, 40 and 42, that are interconnected at mounting surfaces 14, 16 and 18 by wells 32. Each well 34 is also in communication with internal optical cavity 36. Bores 38, 40 and 42 and wells 32 and 34 are machined within block 10 to form a triangular shaped closed loop optical path, with mounting surfaces 14, 16 and 18 located at corners of the optical path.

After machining, block 10 is treated to reduce the size of any surface scratches, fractures, or other deformations formed during machining. In one embodiment, block 10 is treated in an acid etch bath. This is especially effective for eliminating minute imperfections that cannot be seen, yet which could contribute to air leakage if not removed. A relatively smooth surface of moat 12 is important to creating an air-tight seal.

FIG. 3 is a plan section view of a RLG block incorporating the moats of the present invention, with attached mirror and electrode components. The components may be attached in any known manner. In a preferred embodiment, a drop of adhesive such as amyl-acetate is placed in the bottom of each moat 12. Curved mirror 44 is centered on ring 30 of surface 14, directly above well 32, so that the curved surface of the mirror contacts the outside edge of ring 30. Flat mirrors 46 and 48 are centered on rings 30 of surfaces 16 and 18, respectively, directly above wells 32. Electrodes 50, 52, and 54 are placed into moats 12 of sides 20, 22, and 24, respectively, directly above wells 34.

Then, a pre-formed, doughnut-shaped frit seal 56 is placed at the base of each mirror 44, 46, or 48 or electrode 50, 52, or 54, so that it presses onto the lower surface of corresponding moat 12 and surrounds the respective mirror or electrode. Preferably, frits 56 are made of a solder-glass material with a lower melting point than that of block 10 and a similar coefficient of thermal expansion as that of block 10. Then, the RLG is heated, in an oven for example, so that frits 56 melt to permanently and tightly seal each component to block 10. Each preformed frit 56 is initially annular in shape. However, as it melts, the material of frit 56 adheres to the contact surfaces of, and conforms to the shape of, the respective moat 12 and mirror 44, 46, or 48 or electrode 50, 52, or 54 it contacts.

Moats 12 serve several purposes. First, they facilitate achieving an airtight seal by reducing the incidence and size of chips, scratches, or fractures of block 10 in the region of each seal. Because the surface of each moat 12 is slightly recessed relative to side surfaces 14, 16, 18, 20, 22, and 24, the surface of each moat 12 is less susceptible to scratching, chipping, and other damage. Second, the present invention increases the yield of usable blocks 10 because moats 12 can be disposed even on scratched blocks to repair the surface in the vicinity of each seal, leading to significant savings. Moreover, economic savings are realized because the invention allows blocks to be produced with less stringent surface finish requirements without affecting the quality of the resulting RLG. Production of blocks with reduced requirements leads to significant cost savings. Additionally, moats 12 aid in the assembly of RLG's by providing a visual marker by which to center the mirrors and electrodes over the wells on each side of block 10.

Although the present invention has been described with reference to preferred embodiments, workers skilled in the art will recognize that changes may be made in form and detail without departing from the spirit and scope of the invention.

What is claimed is:

1. A ring laser gyroscope structure comprising:

a block having a top surface, a bottom surface, and a plurality of side surfaces, the block having an internal optical cavity that defines a closed loop optical path, wherein each of the side surfaces includes a well in communication with the internal optical cavity; and a moat surface surrounding the well and recessed relative to the side surface, wherein the moat surface is free of damage.

2. The ring laser gyroscope structure of claim 1, wherein the block has six side surfaces.

3. The ring laser gyroscope structure of claim 1, wherein the block is made of a glass material.

4. The ring laser gyroscope structure of claim 1, wherein the block is made of a glass ceramic material.

5. The ring laser gyroscope structure of claim 2, wherein the moat is substantially circular in shape.

6. The ring laser gyroscope structure of claim 5, wherein the moat is substantially concentric to the well.

7. The ring laser gyroscope structure of claim 6, wherein the moat has an outer diameter and an inner diameter, such that the inner diameter of the moat is greater than a surface diameter of the well.

8. A method of creating a ring laser gyroscope structure on a gyroscope block having a top surface, a bottom surface, and a plurality of side surfaces, such that a side surface includes a well, the method comprising forming a moat about the well, wherein a surface of the moat is recessed relative to the side surface of the block, and wherein the moat surface is free of damage.

9. The method of claim 8, wherein the moat is substantially circular in shape.

10. The method of claim 9, wherein the moat is substantially concentric to the well.

11. The method of claim 10, wherein the moat has an outer diameter and an inner diameter, such that the inner diameter of the moat is greater than a surface diameter of the well.

12. The method of claim 8, further comprising treating a surface of the moat with acid to reduce surface deformations.

13. The method of claim 8, further comprising:

attaching a component to the block.

14. The method of claim 13, further comprising:

placing an adhesive onto the moat surface;

placing a component on the block above the well;

placing a frit at the base of the component; and heating the block to cause the frit to melt and form a seal between the component and the moat surface.

15. The method of claim 8 wherein the moat is formed using a machining operation.

16. The method of claim 15 wherein the machining operation is performed in a computer numerical control (CNC) machine.

17. The method of claim 13 wherein the component is a mirror.

18. The method of claim 13 wherein the component is an electrode.

19. A ring laser gyroscope structure comprising:
  a block having a top surface, a bottom surface, a plurality of side surfaces, an internal optical cavity, a first set of wells in a first set of the side surfaces in communication with the cavity, a ring surrounding each of the first set of wells, and a moat surrounding each ring, wherein the moat surface is free of damage; and
  a mirror mounted over each well, ring, and moat.

20. The ring laser gyroscope structure of claim 19, further comprising:
  a second set of wells in a second set of the side surfaces in communication with the cavity, and a moat surrounding each well; and
  an electrode mounted over each well and moat.

* * * * *